UNITED STATES PATENT OFFICE.

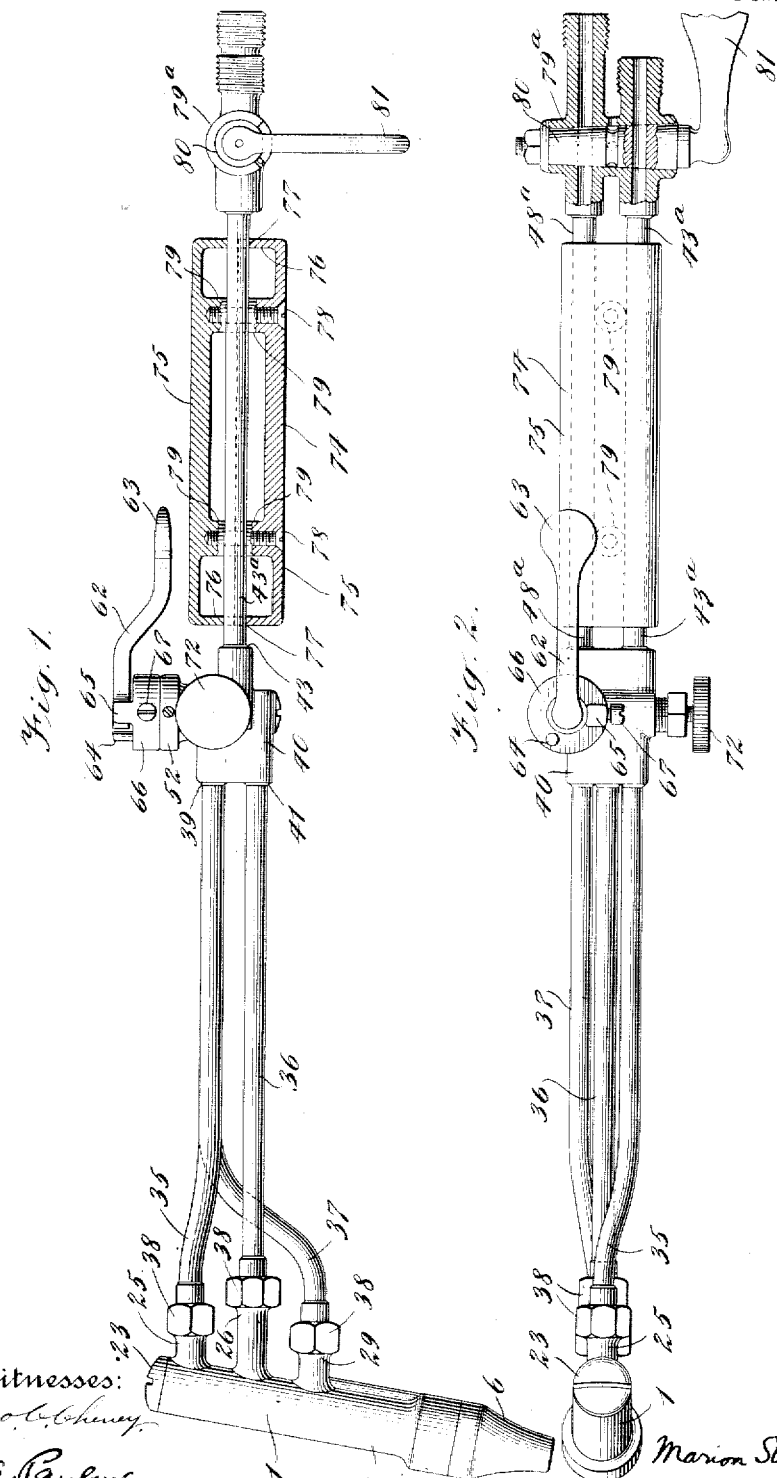

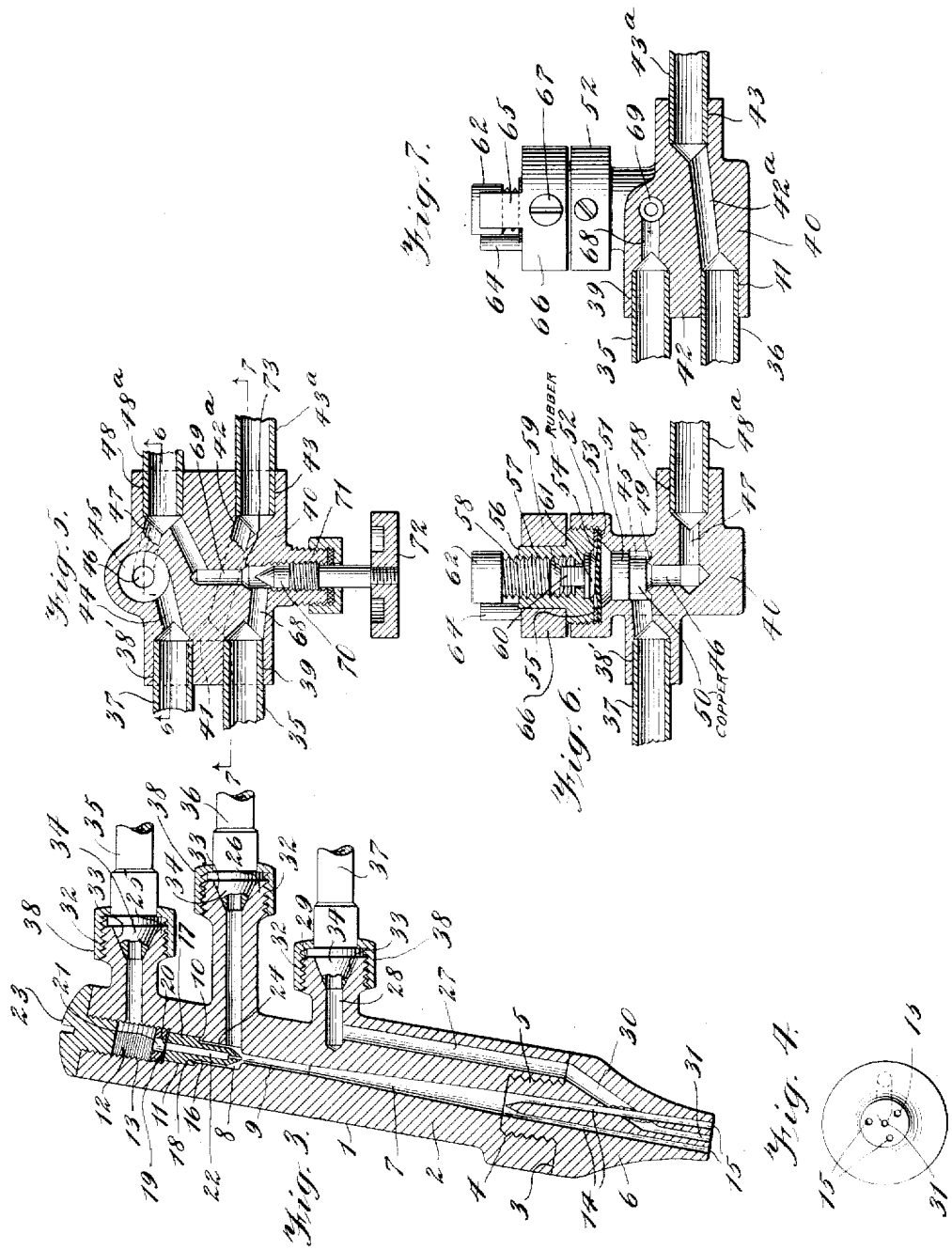

MARION STUART PLUMLEY, OF PITTSBURGH, PENNSYLVANIA, ASSIGNOR TO SUPERIOR OXYGEN COMPANY, OF PITTSBURGH, PENNSYLVANIA, A CORPORATION OF PENNSYLVANIA.

CUTTING-TORCH OR BLOWPIPE.

1,172,903.  Specification of Letters Patent.  Patented Feb. 22, 1916.

Application filed January 5, 1915. Serial No. 552.

*To all whom it may concern:*

Be it known that I, MARION STUART PLUMLEY, a citizen of the United States, residing in the city of Pittsburgh, county of Allegheny, and State of Pennsylvania, have invented certain new and useful Improvements in Cutting-Torches or Blowpipes, of which the following is a specification.

My invention relates broadly and generally to new and useful improvements in torches or blow pipes of that character or type constructed to cut or sever metals, such as iron and steel, and employing a jet or flame for heating the metal along the line of cut, and projecting upon the heated area or line a jet of oxygen, preferably under pressure, to oxidize the metal and displace the oxid resulting from the reaction so as to produce the cut.

The primary object of the invention is to produce a torch or blow pipe of the character described which will be extremely simple and substantial in construction, efficient in operation, and in which the parts may be readily taken apart for repair or readjustment.

A further object is to provide a simple and efficient valve for controlling the supply of cutting oxygen so that such supply may at all times be under complete control by the operator in order that the proper amount will be projected from the torch to perform the cutting effect.

The invention consists in the improvements to be more fully described hereinafter and the novelty of which will be particularly pointed out and distinctly claimed.

I have fully and clearly illustrated a preferred embodiment of my invention in the accompanying drawings to be taken as a part of this specification and wherein:

Figure 1 is a view in side elevation, partly in section, of a construction embodying my invention. Fig. 2 is a top plan view, partly in section, of the construction shown in Fig. 1. Fig. 3 is a central longitudinal section through the torch head for producing the heating jet and the oxidizing jet. Fig. 4 is an end view of the tip end of the head shown in Fig. 3. Fig. 5 is a horizontal section through a controlling valve structure for controlling and regulating the oxygen for mixture with the combustible gas, and for producing cutting operation. Fig. 6 is a section on the line 6—6 of Fig. 5. Fig. 7 is a section on the line 7—7 of Fig. 5.

Referring to the drawings by characters of reference, 1 generally designates a torch head consisting preferably of a body portion 2 having a squared lower end 3 and an internally threaded central socket 4, the latter being adapted to receive a threaded nipple 5 carried on the rear end of a tip 6. The body 2 is provided with a longitudinal bore 7 constituting a mixing chamber for the inflammable mixture to constitute the preheating flame. This duct preferably flares from its inner to its outermost end, as shown in Fig. 3, and at its opposite or inner end opens into an intermediate chamber 8, said flared portion and the chamber 8 being preferably separated by a constricted passageway 9. At its opposite end from that opening into the passageway 9, the chamber 8 is surrounded by a shoulder 10 beyond which the head 1 is formed with a circular recess 11, said recess joining at its rear end with a socket 12 opening through the extreme rear end of the head and having its inner wall threaded, as at 13. The outer end of the bore 7 communicates with a plurality, preferably three, outlet ducts 14 extending longitudinally through the tip 6 and arranged so that their outlet orifices 15 are spaced apart equal distances on the outlet face of the tip so as to produce an even distribution of the combustible mixture to constitute the heating flames. Extending through the chamber 10 is an injector nozzle 16, the delivery end of which opens into said constricted passageway 9, and the rear end of which is formed with an enlargement 17, preferably closely fitting the walls of the recess 11 and provided with an intermediate shoulder 18 adapted to be seated upon the shoulder 10, heretofore described. Threaded into the said socket 12 is a perforated plug 19 adapted to engage the rear end of said enlargement 17 on the injector nozzle so as to hold the latter firmly in position against the said shoulder 10, heretofore described. A piece of wire gauze 20 is preferably interposed between the plug 19 and the rear end of the injector nozzle in order to prevent dirt passing into and clogging the passage through the injector nozzle. The opening or perforation through the plug or washer 19 is shown at 21 and provides for communication between the socket 12 and the bore 22 of the injector nozzle. The rear end of the socket is closed by a suitable closure preferably in the form of a screw-plug 23 threaded into engagement with threads 13, said plug being of such length that, when it is screwed into place, its inner end terminates short of the plug 19 so as to provide a chamber between said plug 23 and perforated plug 19. The outside diameter of that portion of the injector nozzle 16 which extends through the chamber 8, is preferably made less than the diameter of said chamber so that an annular space 24 is provided between the injector nozzle and the wall of said chamber, for a purpose to be presently set forth.

The head 1 is preferably provided with upper and lower nipples 25, 26, formed integral with said body and opening respectively into the socket 12 and the chamber 8, heretofore described. The nipple 25 is adapted to be connected to a supply pipe for a supply of oxygen, and the nipple 26 is adapted to be connected to a supply pipe for acetylene or proper combustible gas. Extending longitudinally through the body of the head, and running substantially parallel to the bore 7, is a duct 27 the upper or rear end of which opens into a cross duct 28 passing through a nipple 29 adapted to be connected to a source of high pressure oxygen to be used for producing the cutting jet. The lower or outer end of the duct 27 opens through the lower squared face 3 of the head part 2, and communicates with an inclined duct 30 in the tip 6. The inclined duct 30 extends from its point of communication with the duct 27 inward between two of the ducts 15 and at its lower end communicates with a central duct 31 opening through the end of the tip at a point between the outlets 15, heretofore described, all as shown clearly in Figs. 3 and 4.

Simple and effective means is provided whereby the nipples 25, 26 and 29 may be respectively connected to the supply pipes for low pressure oxygen, acetylene or other combustible gas and high pressure oxygen. For this purpose each of these nipples is provided with external threads 32 and internal cone sockets 33, which are adapted to receive flanged cone heads 34 on the supply pipe 35, 36, 37, respectively, said heads and nipples being connected by flanged nuts 38 engaging the threads 32 and the flanges on said cone heads. By this arrangement the head may be quickly attached to and detached from the said supply pipes so that heads of different capacities, or for other purposes, may be employed on the same torch, and the head may be readily removed for purposes of repair or readjustment. At their rear ends the pipes 35 and 37 are socketed in sockets 38′ and 39 in a control valve casing 40, said valve casing being provided with suitable valve means for controlling the flow of high pressure oxygen to the said pipe 37 and oxygen at a lower pressure for the combustible mixture to the pipe 35. The valve-casing is also provided with a socket 41 to receive the rear end of the acetylene or other combustible gas supply pipe 36, said socket 41 being located preferably beneath the sockets 38′ and 39 and completely separated therefrom by a diaphragm or partition 42 of the valve-casing. At its rear portion the socket 41 communicates with a passage 42ᵃ through the valve-casing opening into the socket 43 of the valve-casing, which receives one end of an acetylene supply pipe 43ᵃ.

The rear end of the socket 38′, heretofore described, opens into a passageway 44 extending through the valve-casing and opening into a cylindrical valve chamber 45, the latter opening through its base into a duct 46, which in turn communicates with a lateral duct 47 communicating with a socket 48, which receives one end of an oxygen supply pipe 48ᵃ leading to a source of high pressure oxygen. The duct 46 is preferably surrounded, within the chamber 45, by a knife edge valve seat 49 with which coöperates a valve block 50 having an enlarged cylindrical upper end or head 51 closely fitting the bore of the cylindrical chamber 45, but capable of free movement up and down toward and away from the valve seat 49. This valve is preferably made of annealed copper or some other material which will not be affected by the stream of oxygen to which it is subjected. This is important because the original contour of the valve is always maintained so that it will properly engage the seat. The valve-casing is provided with an enlarged nipple 52 having an internal shoulder 53 upon which rests a flexible diaphragm 54, preferably of rubber, said diaphragm being held upon said shoulder by a washer 55 and a nut 56 threaded into said nipple 52. The arrangement of the diaphragm, washer and nut 56 prevents escape of oxygen outward through the nipple 52. The nut 56 is provided with an internal threaded bore 57 which receives a threaded plunger rod 58 having upon its inner end a head 59 adapted to contact the upper end of a projection 60 upon the upper end of a button 61, the latter being arranged to rest upon the upper surface of the diaphragm 53. The diaphragm is normally located at a point above and out of contact with the valve head 51 during the operation of the torch, so that the valve may be moved from its seat by the pressure of the oxygen in the duct 46. By rotating the plunger rod 58, the diaphragm may be depressed toward the head 51 of the valve so as to regulate the distance said valve may be moved from its seat by the pressure of oxygen, and said rod may also be operated to move the diaphragm down into positive engagement with the valve to hold the same against its seat 49 to cut off the supply of high pressure oxygen.

Any suitable means may be employed for rotating the plunger rod 58, but I prefer to provide the same with an operating lever 62 extending rearwardly of the valve chamber and having a thumb-piece 63 conveniently located adjacent the handle, to be presently described, whereby the operator may regulate this supply of oxygen by the movement of the thumb alone while grasping the torch in his hand. The swinging movement of the operating lever 62 is limited in both directions by means of spaced stops 64, 65, carried by a collar 66 rigidly secured to the nut 56 by means of a set-screw 67, the stop 64 limiting the opening movement of the valve and stop 65 arresting the closing movement thereof.

The rear end of the socket 39 opens into a duct 68 which communicates with the cross duct 69, leading to the socket 48, heretofore described, whereby oxygen from the supply pipe may pass through the valve body to the socket 39 and pipe 35. The cross duct 69 is controlled by a needle-valve 70 threaded through a nipple 71 extending laterally from the valve-casing and operated by a finger wheel 72 to coöperate with a valve seat 73, so that the pressure of the oxygen supplied to the pipe 35 and the chamber 12 may be reduced to the point necessary to produce a proper mixture with the combustible gas for producing the heating jet or jets. The pipes 43ª and 48ª extend rearward from the control valve and are inclosed within a handle 74 preferably composed of two similar sections each consisting of a semicylindrical hollow body 75 having end walls 76, said end walls being each provided with recesses 77 so that, when the parts 75 are assembled on the pipes 43ª, 48ª, a hollow cylindrical handle is provided in which the end walls abut and the recesses 77 therein form spaced openings surroundings said pipes and maintaining them in parallel relation. The handle sections may be secured together in any suitable manner, but preferably by clamping screws 78 extending through registering bosses or sleeves 79 formed integral with the face of said section. This handle is so located that, when grasped by the operator, the thumb part 63 of the operating lever 62 will be located closely adjacent to the upper surface of the handle, where said thumb-piece may be continuously engaged, if desired, by the operator, so that at all times the supply of high pressure oxygen will be under complete and convenient control.

Beyond the rear end of the handle the pipes 43ª, 48ª, are connected to a turn plug casing 79ª containing a turn plug 80 by means of which flow of acetylene or other combustible gas and oxygen to said pipes, respectively, is controlled. The turn plug is provided with a suitable handle 81 by means of which the flow through said pipes may be simultaneously controlled.

In operation the operator first moves the high pressure valve lever 62 into position to hold the valve 50 in closed relation to its seat 49, and then opens the needle valve 70 to permit oxygen at the proper pressure to flow through the pipe 35 to the chamber 12, and through the bore 22 of the injector nozzle 16. The turn plug 80 is then operated to permit the simultaneous flow of oxygen through the said pipe 35, as described, and of acetylene or other suitable gas through the pipe 36 to the annular space 24 surrounding the injector nozzle 16. By the injector action produced the two gases pass through the bore 9 into the mixing chamber 7, said gases being thoroughly mixed in said bore and chamber, producing a combustible mixture which flows from the head through the passageways 14 and outlets 15. Upon ignition in any suitable way the heating flame is produced adapted for primarily heating the metal which is to be severed or cut. When the proper heating flame is produced, the operator then, by the movement of his thumb, swings the operating lever 62 from its position against the stop 65 in the proper direction to permit the valve 50 to be raised from its seat by the high pressure oxygen which flows into the pipe 37 and through the ducts 27, 30, and 31 to be impinged upon the area heated by the heating flame described, in order to oxidize the metal and displace the same to produce a space or cut which results in the severing of the metal. During this operation the operator may swing the valve lever 62 in either direction in order to increase or decrease the supply of cutting oxygen and at the same time has an independent control by means of the needle valve 70 to regulate the pressure of oxygen supplied to the heating jet.

What I claim and desire to secure by Letters Patent of the United States is:—

1. In a cutting torch, a head, pipes for supplying a combustible mixture and an oxygen jet under high pressure to said head, a valve controlling said high pressure oxygen and comprising a casing having a seat, a valve body movable from said seat by pressure of the oxygen, a diaphragm located on the opposite side of the valve from the said seat, and a screw for adjusting the position of the diaphragm relative to the valve body.

2. In a cutting torch, a head, pipes for supplying a combustible mixture and an oxygen high pressure jet to said head, a valve controlling the flow of high pressure oxygen and low pressure oxygen to the head and comprising a casing having an oxygen inlet, a passage connecting said oxygen inlet with the low pressure supply to the head, a separate and independent passageway connecting said oxygen inlet to the high pressure supply to the head, a valve chamber with which said second passage communicates and having a seat, a valve body movable from said seat by pressure of the oxygen, a diaphragm sealing said casing and located above the valve body, a plunger rod threaded in the casing, a button intermediate the plunger rod and the diaphragm and an operating lever carried by the plunger rod.

In testimony whereof I have hereunto signed my name in the presence of two subscribing witnesses.

MARION STUART PLUMLEY.

Witnesses:
C. G. HEYLMUN,
M. E. McNINCH.

It is hereby certified that in Letters Patent No. 1,172,903, granted February 22, 1916, upon the application of Marion Stuart Plumley, of Pittsburgh, Pennsylvania, for an improvement in "Cutting-Torches or Blowpipes," errors appear in the printed specification requiring correction as follows: Page 2, line 121, for the reference-numeral "53" read *54;* page 3, lines 49–50, for the word "surroundings" read *surrounding;* and that the said Letters Patent should be read with these corrections therein that the same may conform to the record of the case in the Patent Office.

Signed and sealed this 14th day of March, A. D., 1916.

[SEAL.]
J. T. NEWTON,
*Acting Commissioner of Patents.*

Cl. 158—135.